(12) United States Patent
Bartlett (10) Patent No.: US 6,347,290 B1
(45) Date of Patent: Feb. 12, 2002

(54) APPARATUS AND METHOD FOR DETECTING AND EXECUTING POSITIONAL AND GESTURE COMMANDS CORRESPONDING TO MOVEMENT OF HANDHELD COMPUTING DEVICE

(75) Inventor: Joel F. Bartlett, Los Altos, CA (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/103,903

(22) Filed: Jun. 24, 1998

(51) Int. Cl.$^7$ ................................................ G09G 3/00
(52) U.S. Cl. ...................................... 702/150; 345/863
(58) Field of Search ....................... 702/150; 345/145, 345/146, 157, 158, 863, 864

(56) References Cited

U.S. PATENT DOCUMENTS

| | | | |
|---|---|---|---|
| 5,195,179 A | * 3/1993 | Tokunaga | 395/161 |
| 5,305,181 A | 4/1994 | Schultz | |
| 5,416,730 A | 5/1995 | Lookofsky | |
| 5,477,237 A | * 12/1995 | Parks | 345/156 |
| 5,587,577 A | 12/1996 | Schultz | |
| 5,734,371 A | * 3/1998 | Kaplan | 345/158 |
| 5,910,797 A | * 6/1999 | Beuk | 345/157 |
| 5,926,178 A | * 7/1999 | Kurtenbach | 345/352 |
| 5,969,708 A | * 10/1999 | Walls | 345/145 |
| 6,043,805 A | * 3/2000 | Hsieh | 345/158 |
| 6,072,467 A | * 6/2000 | Walker | 345/157 |
| 6,097,369 A | * 8/2000 | Wambach | 345/158 |
| 6,130,663 A | * 10/2000 | Null | 345/158 |

OTHER PUBLICATIONS

Fitzmaurice et al., The Chameleon: Spatially Aware Palmtop Computers, ACM, Apr. 1994.*

Harrison et al., "Squeeze Me, Hold Me, Tilt Me! An Exploration of Manipulative User Interfaces", ACM, Apr. 1998.*

Rekimoto; "Tilting Operations for Small Screen Interfaces" Sony Computer Science Laboratory Inc.; pp. 167–168; 1996.

Small et al.; "Graspable Interface Design" MIT Media Laboratory; pp. 1–8.

Rekimoto et al. "The World through the Computer: Computer Augmented Interaction with Real World Environments", http://www.csl.sony.co.jp/person/{rekimoto,nagao}.html, pp 29–36 pulled Nov. 14–17, 1995.

C. Verplaetse, "Inertial proprioceptive devices; Self–motion–sensing toys and tools" IBM Systems Journal, vol. 35, NOS3&4, pp 639–650, 1996.

* cited by examiner

Primary Examiner—Patrick Assouad
(74) Attorney, Agent, or Firm—Pennie & Edmonds LLP (57) ABSTRACT

A method is provided for processing an input command for a handheld computing device, comprising the steps of: measuring movement of the device over an interval of time with a motion sensor mounted to the device to generate a signal; analyzing the signal measured over the interval of time to determine a gesture command that corresponds to the movement of the device; and processing the gesture command to control the device as of an orientation of the device at the beginning of the interval. In addition to gesture commands, position commands can be input. Position commands are processed by measuring of a series of orientations of the device, analyzing the signal to determine a series of position commands that correspond to the series of orientations of the device, and processing the series of position commands to control the device. The method of processing of gesture commands avoids confusion due to inappropriate processing of orientations falsely determined to be position commands.

23 Claims, 8 Drawing Sheets

APPARATUS AND METHOD FOR DETECTING AND EXECUTING POSITIONAL AND GESTURE COMMANDS CORRESPONDING TO MOVEMENT OF HANDHELD COMPUTING DEVICE

FIELD OF THE INVENTION

This invention relates generally to command processing by a device and, more particularly, to proper processing of a command that requires an interval of time for input to an electronic device.

BACKGROUND OF THE INVENTION

The traditional desktop computer-human interface, i.e. that which relies on keyboards and pointing devices, is of little or no use in many contemporary "computing" devices, such as handheld computers, pagers, and cellular phones. Alternative methods for command input, other than the desktop computer "point and click" approach, are needed. This is particularly true for small, portable devices in which space constraints limit the potential use of buttons for finger input of commands.

Novel approaches to the computer-human command submission interface exist with the goal of improving the interface or providing alternatives with new utility. Some approaches utilize commands that require an interval of time for submission. Such approaches encounter problems in implementation because the command is not recognized and identified until the completion of the interval of time. In contrast, a device user typically expects the device to respond with respect to the state of the device at the beginning of submission of the command. Hence, command types that require an interval of time for submission or entry can cause delays in processing the command and therefore an unexpected response. By the time the command has been identified, the state of the device may have changed.

At first glance, a "double-click" of a "mouse" button appears to be a command that requires an interval of time for submission. A simple method, however, is used to avoid the problem of confusing a double-click with a single-click. In a typical desktop computer, all clicks are immediately processed at the time of occurrence. If a click was preceded by a first click, within a preset time interval, the second click is treated as a double click with its own associated command, e.g. an "activate" command. For example, the first click selects an icon in the computer display and the second click activates the icon. If the second click occurs after the lapse of the preset time interval, the second click is treated as a single click and merely reselects the icon. Thus, the first click of a double click causes the same action as a single click, i.e. they both are "select" commands. This makes implementation of these command inputs relatively simple.

Some, more complex, commands are not amenable to the above approach. In these situations, the state of the device can change during the interval of time of command submission. A method for command processing is desired to permit the use of commands that are a function of time in devices with a state that can vary during submission of a command.

SUMMARY OF THE INVENTION

A method is provided for processing an input command for a handheld computing device, comprising the steps of: measuring movement of the device over an interval of time with a motion sensor mounted to the device to generate a signal; analyzing the signal measured over the interval of time to determine a gesture command that corresponds to the movement of the device; and processing the gesture command to control the device as of an orientation of the device at the beginning of the interval. In addition to gesture commands, position commands can be input. Position commands are processed by measuring of a series of orientations of the device, analyzing the signal to determine a series of position commands that correspond to the series of orientations of the device, and processing the series of position commands to control the device. The method of processing of gesture commands avoids confusion due to inappropriate processing of orientations falsely determined to be position commands.

The above method for speculative execution of commands permits a response expected by the computer user given the time at which the user began submission of a command. The method further provides for avoidance of confusion between position commands and gesture commands. The method of speculative execution eliminates the need for a pause while awaiting completion of an input of a command.

BRIEF DESCRIPTION OF THE DRAWINGS

The following detailed description makes apparent other purposes and advantages of the invention, with reference to the drawings in which:

FIGS. 4a, b, and c depict a GUI that displays an address database:

4a shows a vertical list of the alphabet;

4b shows a list of names; and 4c shows the detailed address information for one individual in the database.

DETAILED DESCRIPTION OF PREFERRED EMBODIMENTS OF THE INVENTION

1. A Method for Use of Gesture Commands

A method is provided for finger-free command or data input through hand movement. The method can supplement position command input via hand orientation or position. The following three sections (1a, 1b, and 1c) present: first, a description of gesture and position commands; second, a method for gesture command input; and third, examples of uses for gesture commands.

Note in the following that descriptions of hand movement and hand position are equivalent to descriptions of device movement and device position. It should be implicitly understood that the hand has attached to it a device that includes means for sensing movement and position, such as a motion sensor.

a. Description of Commands

Commands that include hand movement are here termed gesture commands. In contrast, commands that are correlated to a particular angular orientation of a hand are here termed orientation or position commands. Position commands are given instantaneously, i.e. the position command given at any instant in time is equated to the position of the hand at that instant in time. Gesture commands are physically distinct from position commands: a gesture command requires an interval of time for submission by the hand. A gesture command comprises a time varying position expressed as a unique pattern of movement over an interval of time. A variety of gesture commands can be defined by use of different gesture movements, that is, different and repeatable patterns of movement expressed over an interval of time can be mapped to different commands.

Note the physically opposing yet complementary nature of position commands and gesture commands. A position command is submitted instantaneously: the position command at a given instant in time is simply a function of the position of the hand at that instant in time. In contrast, a gesture command requires an interval of time for submission: the gesture command is a function of a time varying position where the position varies during the interval of time. Position commands cannot be submitted in isolation. Motion through a range of positions is required to achieve a desired position of the hand. Thus, a series of position commands are submitted at the intermediate orientations that the hand passes through prior to the final desired position. In contrast, a gesture command can be submitted as a solitary event.

Figure 1:
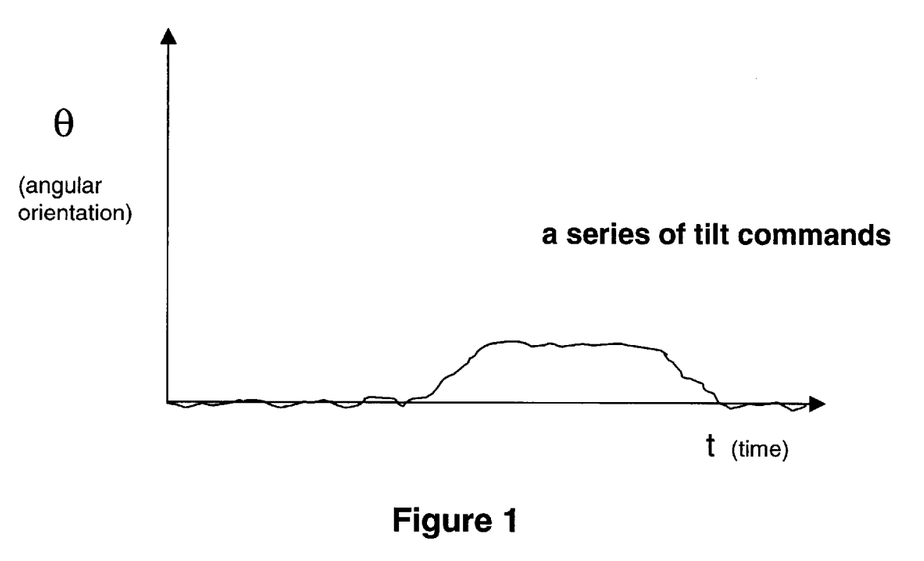
FIG. 1 is a timing diagram of a series of tilt commands.

A position command can comprise, for example, a fixed angular orientation relative to a particular axis of rotation. A gesture command can comprise, for example, an angular orientation that varies over an interval of time relative to a particular axis of rotation. FIG. 1 graphically depicts an example of a series of position commands submitted during a time sequence. A position command in this example corresponds to the angular orientation, θ, about an axis of rotation. At each instant in time, the position command corresponds to the value of θ at that instant in time.

At the beginning of the time sequence in FIG. 1, the hand is oriented in a "neutral" position: the neutral position can be set at θ equal to zero or any preferred value. The neutral position is a rest position, that is, no command is submitted in the neutral position. The neutral position can be established in a number of ways. For a device that is receiving gesture commands, the position of the device at the time the device is turned on can be defined as the neutral position. Alternatively, the neutral position can be reset through submission of commands to the device.

As the time sequence progresses in FIG. 1, a series of position commands of increasing θ are submitted. The series of commands reach a plateau in the value of θ and eventually decrease in the value of θ as the hand returns to the neutral position. The fine scale undulations in the series of position commands represent the slight random movement or "noise" that would typically be exhibited by a hand.

Figure 2A:
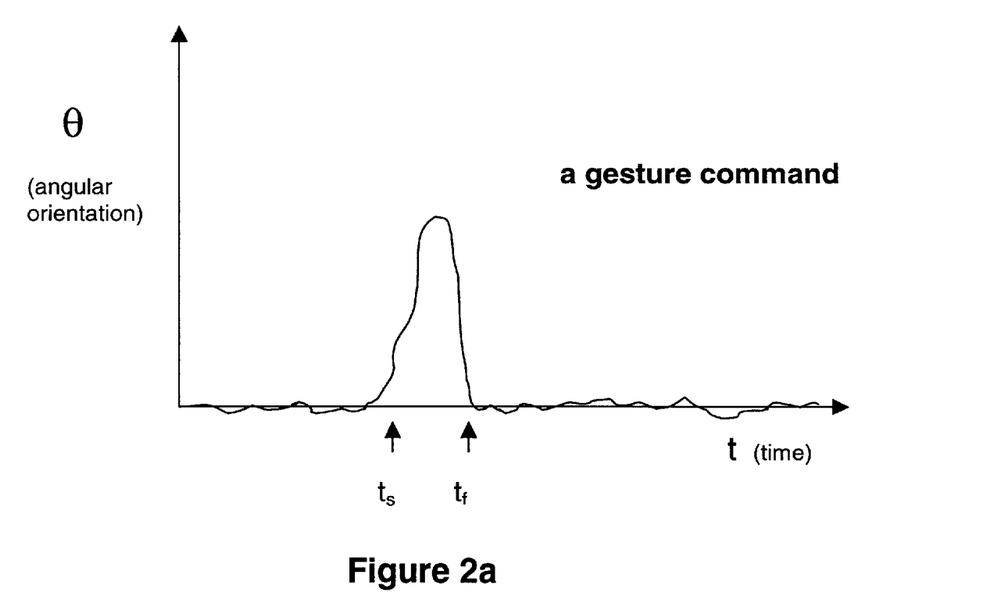
FIGS. 2a, b, c, and d are diagrams of example gesture commands in terms of angular orientation as a function of time.
Figure 2B:
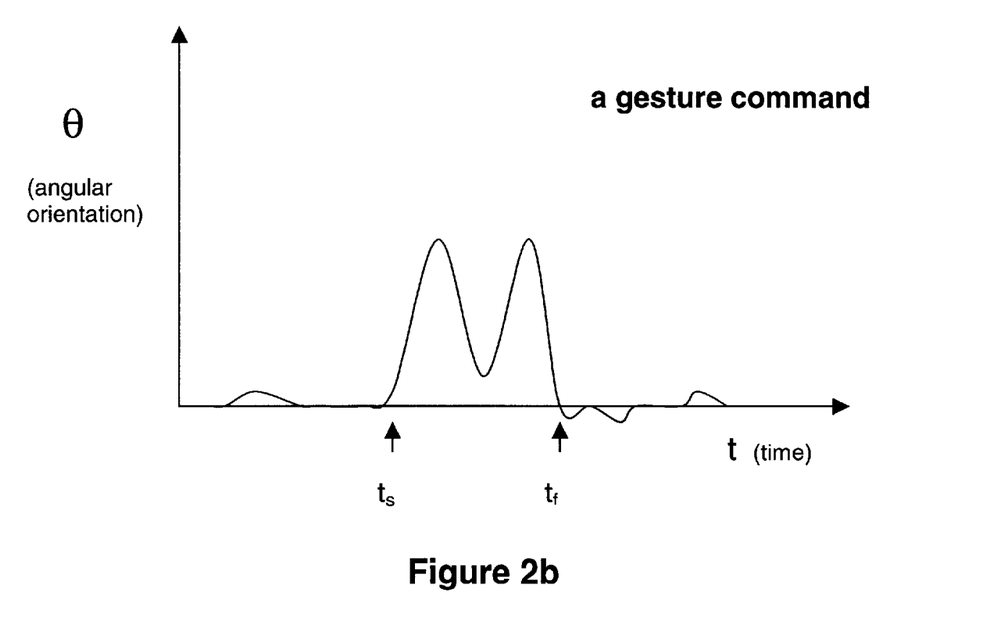
Figure 2C:
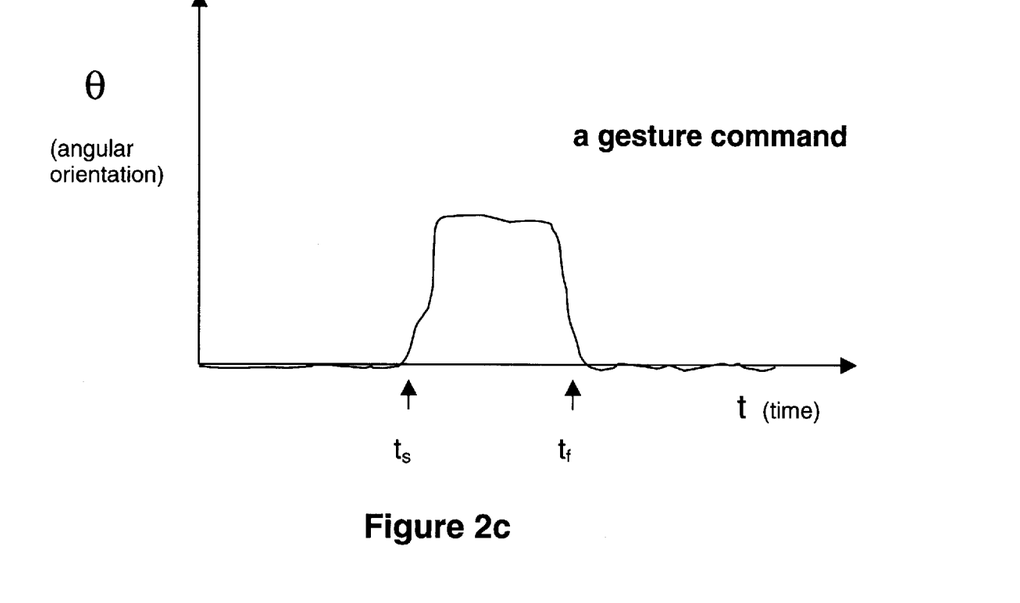
Figure 2D:
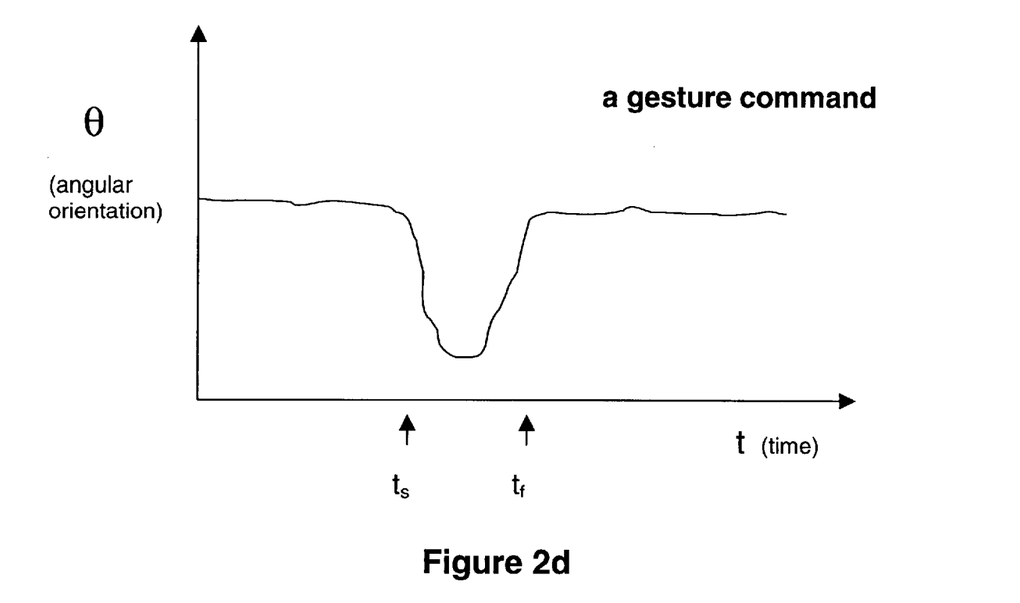

FIGS. 2a, b, c, and d show examples of four different, single gesture commands. Each of the example gesture commands is expressed over an interval of time commencing at $t_s$ and concluding at $t_f$ where the angular orientation about an axis of rotation varies during the interval of time. The example in FIG. 2a shows a gesture command that comprises a rotation in a positive angular direction followed immediately by a return approximately to the starting position. The example gesture command of FIG. 2b comprises a pattern of movement similar to that in FIG. 2a though repeated twice in immediate succession. FIG. 2c shows a gesture command that is similar to the command that is depicted in FIG. 2a though possessing a brief delay prior to returning to the starting angular orientation. Lastly, FIG. 2d shows a gesture command that commences with a movement in a negative angular direction. Note that the gesture commands of FIG. 2a and FIG. 2d have patterns of movement that are mirror images of each other. More generally, any pattern of movement has a related mirror image pattern of movement. Different patterns of movement, such as the four described above, can be correlated to different gesture commands. A computing device that makes use of gesture commands can employ different gesture commands to obtain different responses of the computing device.

The above-described position and gesture commands can be further generalized. Position commands can correspond to angular orientations relative to any of three orthogonal axes. Gesture commands can correspond to a pattern of movement relative to one of the three orthogonal axes. More complex patterns of movement can include rotational movements about two or three of the three orthogonal axes. Hence, a great variety of gesture commands are possible.

b. Method for Gesture Command Submission

Figure 3:
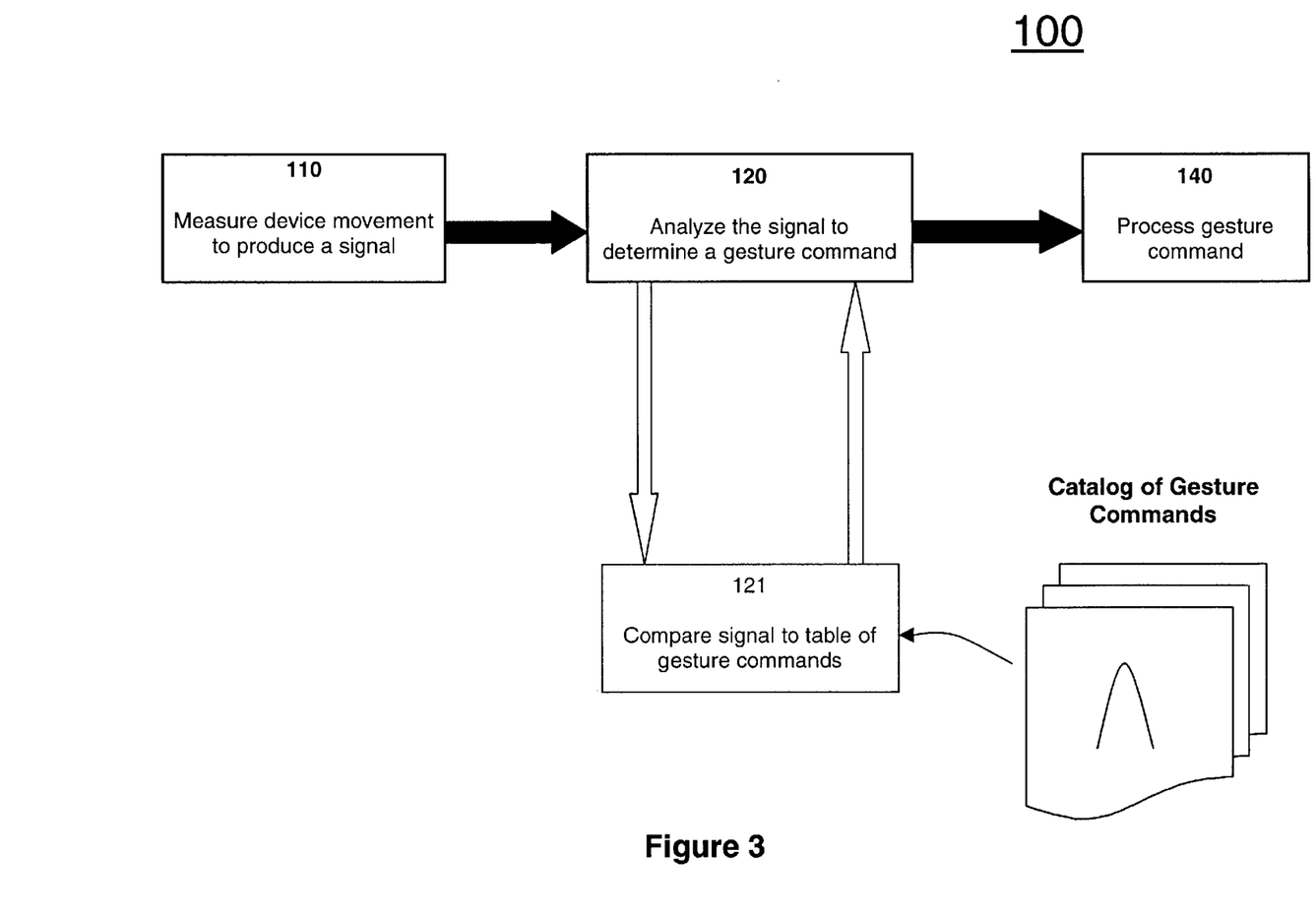
FIG. 3 is a flow chart of the steps for utilizing gesture commands.

FIG. 3 depicts steps 100 for input of gesture commands to a computing device. In step 110, movement of the computing device is measured over an interval of time. A motion sensor attached to the device measures the movement and generates a signal that corresponds to the movement. Analysis of the signal in step 120 determines if a gesture command was submitted during the interval of time.

If the computing device makes use of more than one gesture command, the particular gesture command that was submitted is determined in step 121. This determination is accomplished by comparison of the gesture that was submitted during the interval of time with a catalog of gesture commands. A match between the submitted gesture and a gesture command in the catalog serves to identify the submitted gesture command. Allowance is made for the minor variations in movement that are typically expected for repeated hand movements, i.e. a perfect match is not required to determine the gesture command.

In step 140, the gesture command is processed to control the computing device. The actions of steps 110 through 140 can be repeated to permit submission of a series of gesture commands.

A series of position commands can be submitted along with a series of gesture commands. A computing device can employ a single motion sensor to measure all commands or multiple motion sensors can be employed.

c. Examples of the use of Gesture Commands

Figure 4:
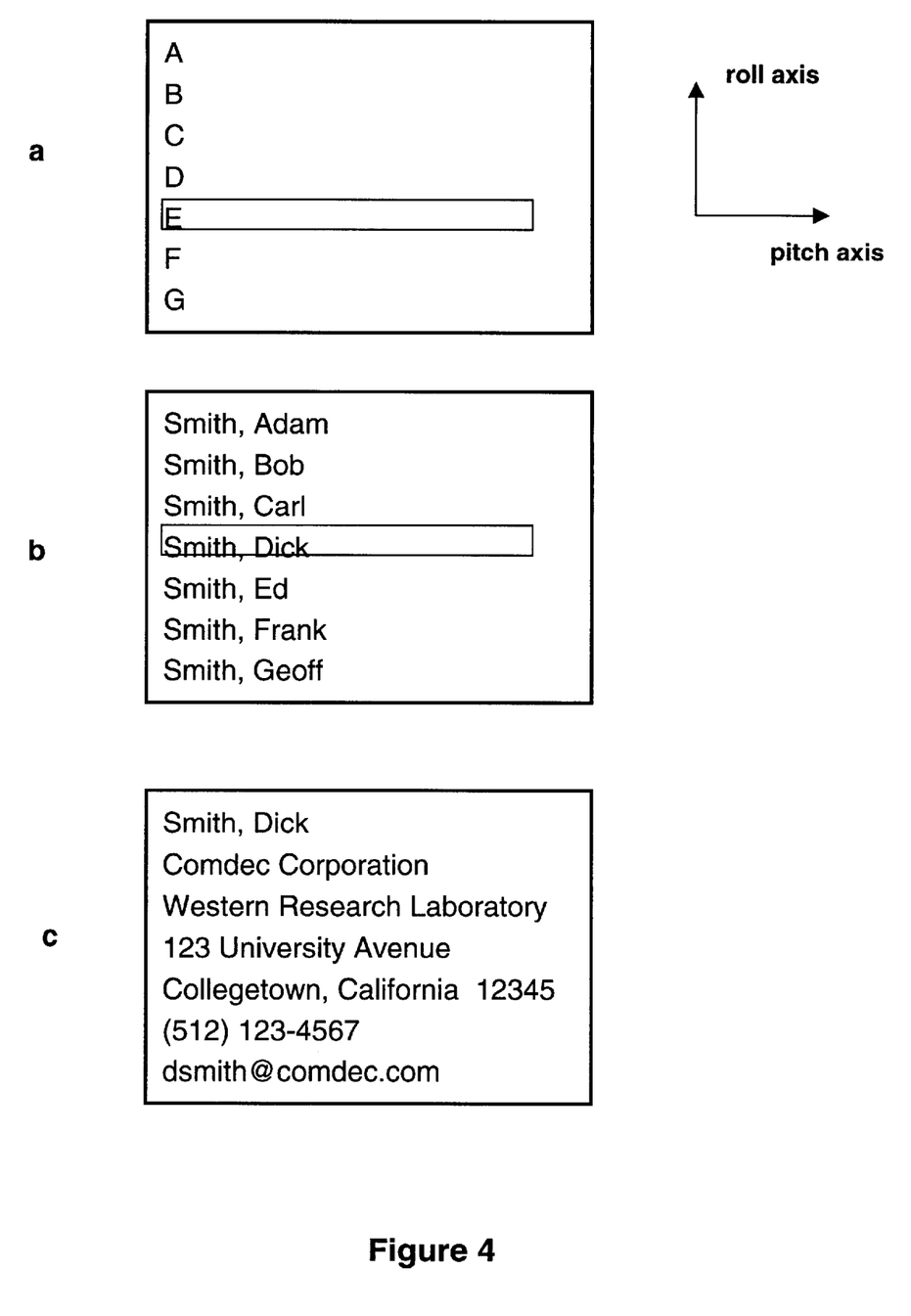

Different position and gesture commands can be employed to initiate different types of responses in a computing device. For example, position and gesture commands can be used, respectively, to initiate select and activate responses in a computer's GUI. A GUI that provides access to an address database serves as an example of a very simple implementation. FIGS. 4a, b, and c depict the appearance of the GUI in a computer display screen at three different moments in time. FIG. 4a shows the GUI displaying the alphabet in a vertical list. A highlighted "selection" band highlights the letter "E". The computer user scrolls through the alphabet until the desired letter is highlighted. During scrolling, the selection band can first move to the top or bottom of the list followed by scrolling of the list. Alternatively, the selection band can reside at a fixed location in the GUI with the text doing all the scrolling.

In response to a series of position commands, the list scrolls vertically. Preferably, as indicated, the scrolling position commands would be a function of angular orientation relative to the pitch rotation axis. The direction of scrolling, i.e. up or down, is determined by the angular orientation of a position command, i.e. whether the angular orientation is positive or negative. The neutral position, e.g. θ equal to zero, is determined as previously described.

In one alternative, the magnitude of θ determines the scrolling rate, as the table below shows.

| Tilt position | GUI scrolling rate |
| --- | --- |
| $\theta < \theta_1$ | none |
| $\theta_1 < \theta < \theta_2$ | stepwise |
| $\theta_2 < \theta < \theta_3$ | continuous; rate increases with θ |

To prevent a response to small movements, including noise, angular orientations of very small magnitude, $\theta<\theta_1$, are ignored. Angular orientations of a magnitude within a first angular range, $\theta_1<\theta<\theta_2$, produce slow, stepwise scrolling, to ease selection of a particular letter. Angular orientations of a magnitude within a second angular range, $\theta_2<\theta<\theta_3$, produce continuous scrolling with the rate of scrolling increasing with an increasing magnitude of the angular orientation.

Once the selection band highlights the desired letter, a gesture command, preferably about the roll axis, as indicated in FIG. 4a, serves to activate that letter. In the example of FIG. 4b, gesturing for the letter "S" shifts one level downward in the database hierarchy: the display then presents a vertical list of individuals whose last names begin with the letter "S". Scrolling through the name list proceeds, as above, via position commands until the desired individual's name is found and placed at the selection bar. A second gesture command activates the name, with the same sort of activation response as described above: a shift downward one level in the database hierarchy. The details of the individual's personal information are then displayed as depicted in FIG. 4c.

Many variants in the GUI's response are possible through the use of different gesture commands. For example, a clockwise fanning pattern of movement and a mirror image counterclockwise fanning pattern of movement can provide down-shift and up-shift activation commands. Gestures about a second axis, e.g. the pitch axis, can provide commands to lock and unlock the GUI, that is, responses by the GUI can be temporarily shutoff. In an alternative where two-dimensional lists of items are displayed, position commands relative to a second axis, preferably the roll axis, can be used to initiate horizontal scrolling of the lists. Activation of items through gesture commands can be accomplished as described for one-dimensional lists.

Alternatively, the various motion commands can provide a large range of responses in more sophisticated GUIs than those described above. GUIs with pull-down menus are accommodated with a similar command scheme. Scrolling in two-dimensions is again initiated through position commands about two axes until a desired menu item is highlighted. A gesture command then serves to activate or "open" the highlighted menu item. A highlighted selection bar within the pull-down menu can then be scrolled to a desired menu item and the item activated with a gesture command.

Figure 5:
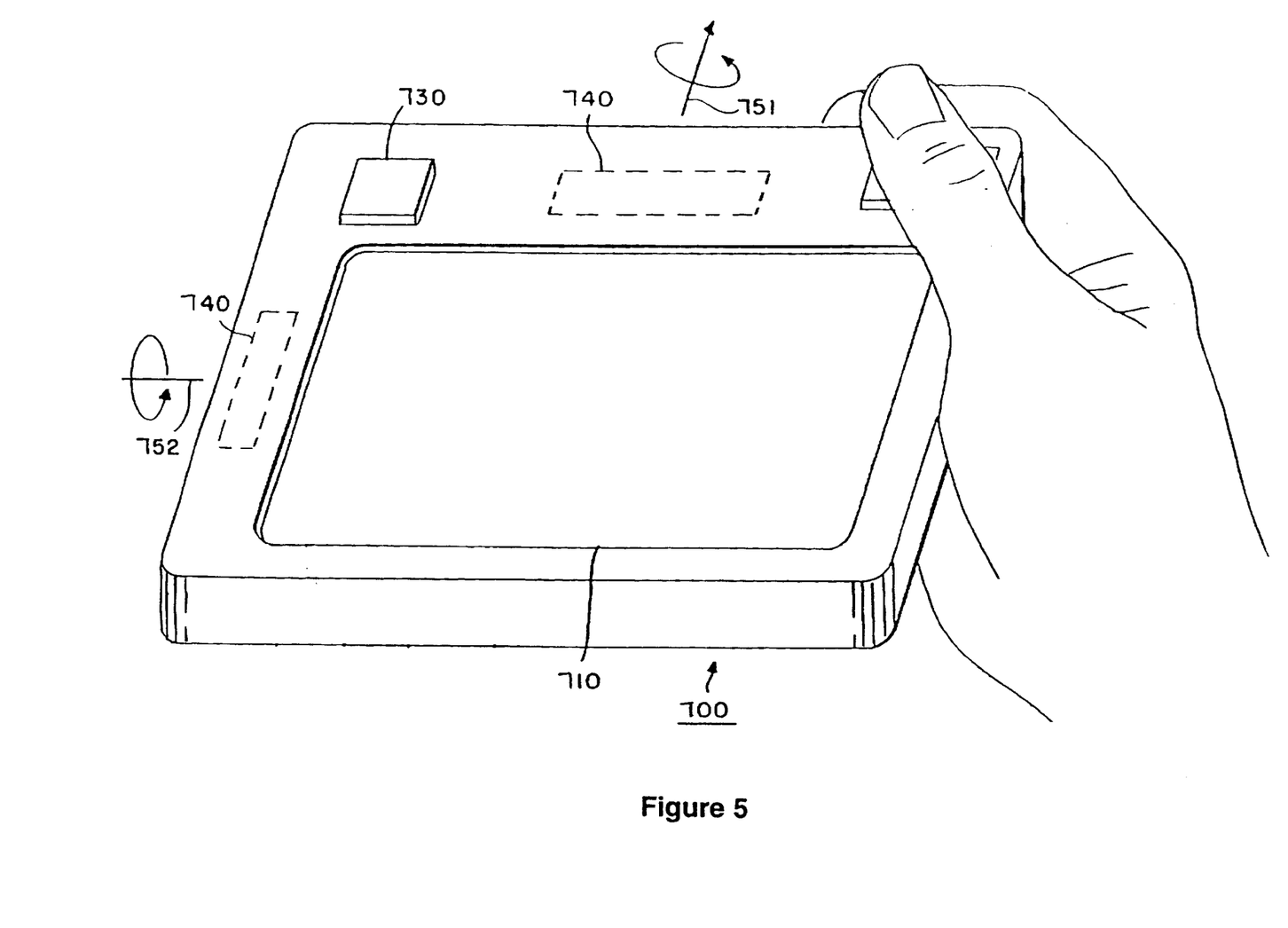
FIG. 5 depicts an image display device that is controlled via gesture commands.

An example of an image display device 700 that makes use of position and gesture commands is depicted in FIG. 5. The display device 700 is handheld and includes motion sensors 740 for receipt of position and gesture commands. The display device can include a button 730 as an on/off switch. The angular orientation of the display device 700 can be changed about the roll axis 751 and the pitch axis 752 for submission of position and gesture commands.

The display device 700 is used to observe images that are stored in a database. Scrolling position commands are used to scroll from image to image displayed on a display screen 710 until an image of interest is found. A gesture command then activates the displayed imaged for more detailed viewing. Additional gesture commands serve to "zoom" in to observe the selected image in greater detail or to zoom out to observe a greater portion of the image or the entire image. Position commands, again, serve to scroll the image across the display screen 710.

The above described method for input of gesture commands can be applied in the operation of a variety of computing devices, in particular, wearable versions of computing devices. Such devices include watches, televisions, radios, cellular phones, pagers, and two-way radios. For example, a cellular phone could be turned on and off and phone numbers selected and dialed, all without use of buttons. Further, gesture commands can be generalized to include translational movements in addition to rotational movements.

2. Speculative Execution of Commands

As depicted in FIGS. 2a, b, c, and d, submission of a gesture command is initiated at time $t_s$. Complete submission of the gesture command, however, requires a finite interval of time $\Delta t$ equal to $t_f$ minus $t_s$. Therefore, the existence and identity of the command cannot be determined until an interval of time of length $\Delta t$ after submission of the command begins. Confusion in command processing can occur during the interval of time. For example, a portion of a gesture command can be interpreted to be a series of position commands and acted upon as such prior to completion of the gesture command.

Figure 6:
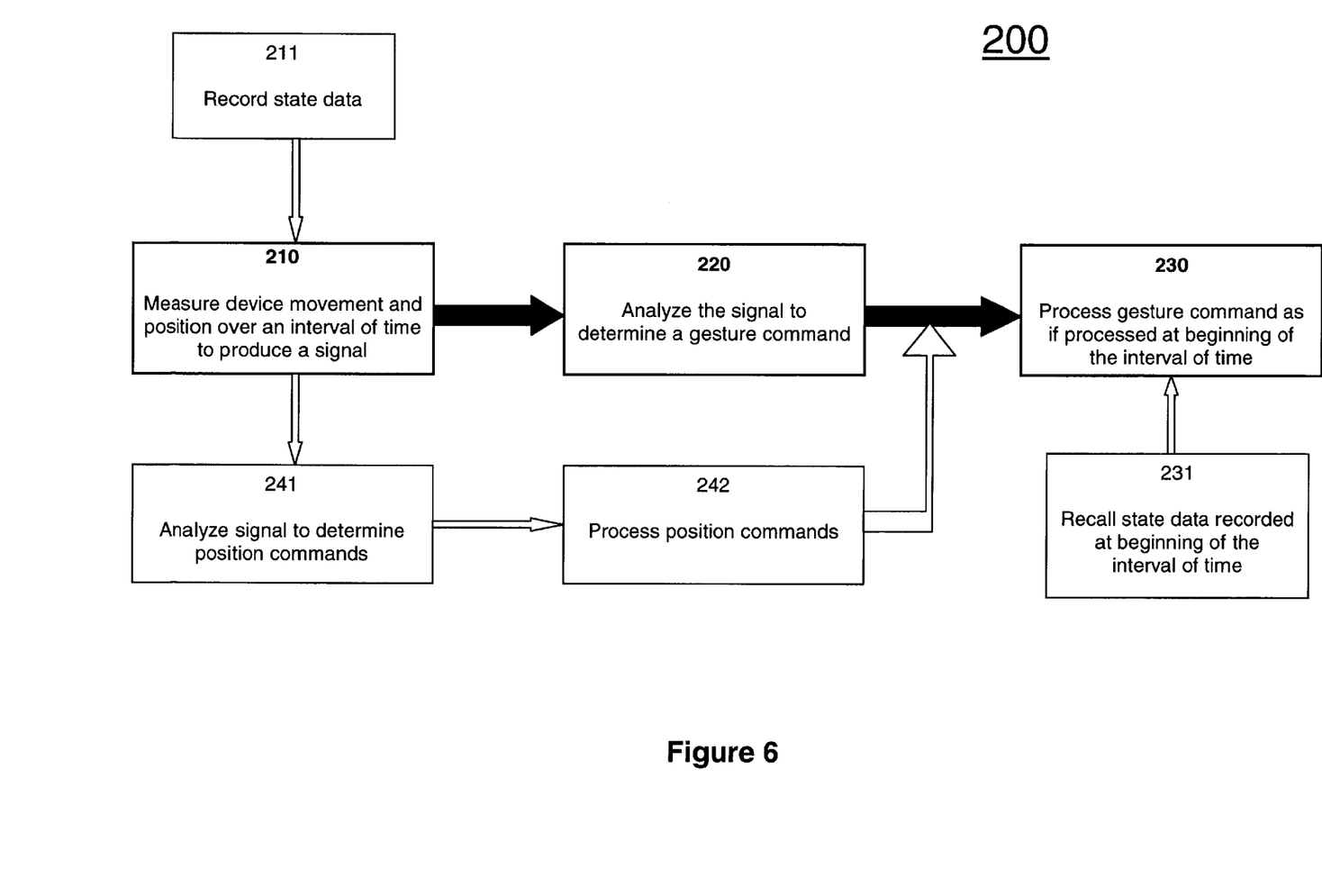
FIG. 6 is a flow diagram of the steps for speculative execution of a command.

FIG. 6 depicts the steps 200 in a method for speculative execution of commands. The method serves to produce an expected response in a computing device in response to submission of a gesture command. The method is also applicable to any command types that require an interval of time for submission.

At step 210, device movement is measured via a motion sensor attached to the device. A signal that corresponds to the movement is produced. At step 220, the signal that was produced during the interval of time is analyzed to determine if it corresponds to a gesture command. If a gesture command is determined at step 220, step 230 then occurs: the gesture command is processed as if it had been processed at time $t_s$.

Position commands can be utilized in parallel with gesture commands. In step 241, the signal is analyzed to determine a series of position commands. At step 242, each position command is processed upon determination. If a gesture command exists during the interval of time, the various orientations present in the gesture command may falsely be determined, at step 241, as position commands. The false position commands will then inappropriately be processed at step 242. The confusion is corrected at step 230. By processing the gesture command as if it had been processed at the beginning of the interval of time, the effects of the false position commands are rejected. That is, the gesture command controls the device as of the orientation that existed at the time $t_s$.

Steps 211 and 231 as shown in FIG. 6 indicate one implementation of the above method. At step 211, the state of the device is recorded. Recording is done continuously. At step 231, recorded state data of the device is provided for the processing of the gesture command performed at step 230.

State data that was recorded at time $t_s$ provides a reference for the appropriate processing of the gesture command in step 230.

A simple example of the recording of state data can be given with reference to FIG. 4*a*. A series of position commands would cause scrolling of the alphabet that appears in the GUI displayed in FIG. 4*a*. As the display scrolls, the state of the display would be recorded over time. That is, the letter that was highlighted at a particular point in time in the past could be determined by recalling the recorded data for that particular point in time. After submission of a gesture command, the gesture command could then be correctly applied to the letter that was highlighted at the beginning of the gesture command by recalling the state data for that time.

3. Button Free Wearable Computer

Figure 7:
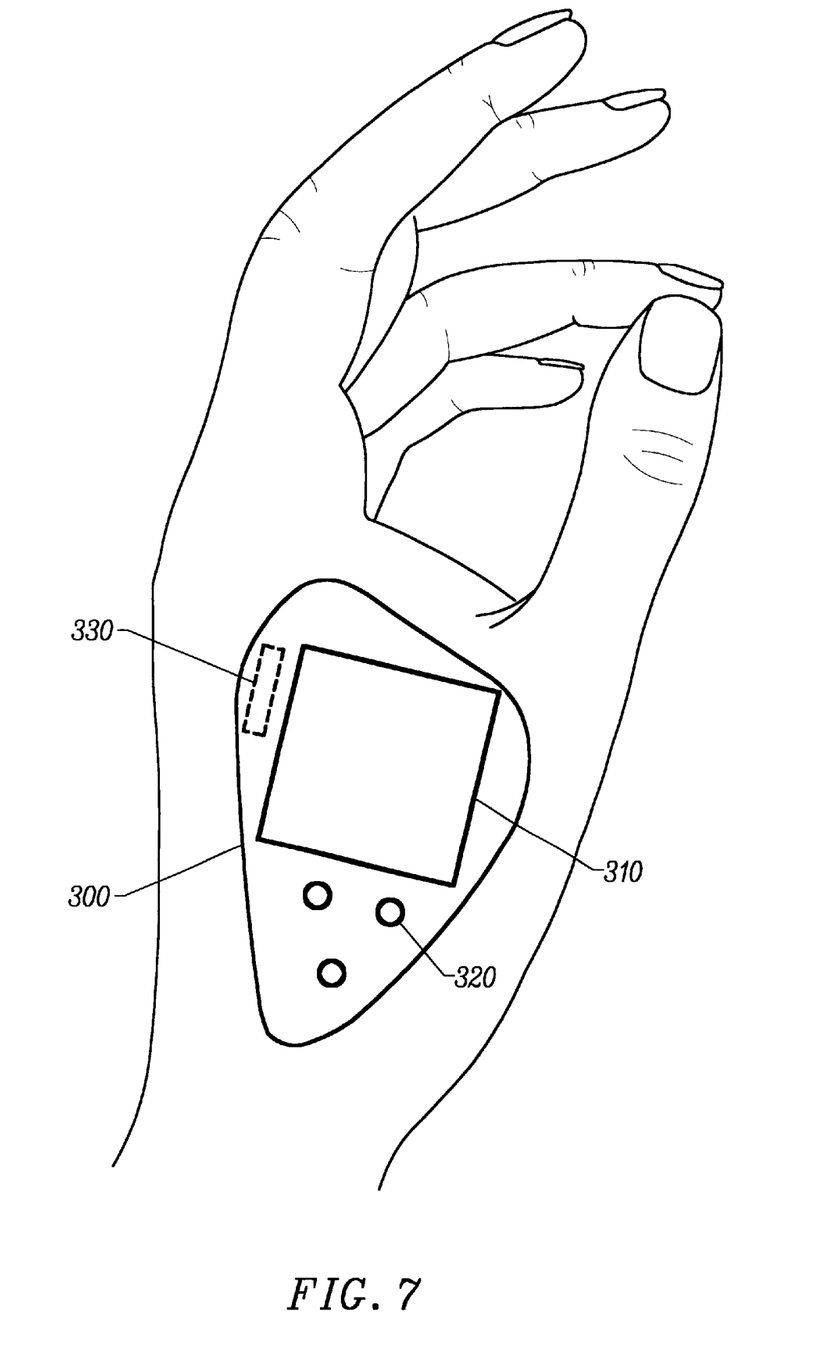
FIG. 7 depicts a wearable computer mounted to a superior dorsal aspect of a hand.

FIG. 7 depicts a wearable computer 300 mounted on a superior dorsal aspect of a hand. The wearable computer 300 includes a motion sensor 330. The wearable computer 300 is handheld in the sense that it is mounted to the hand. With this mount location, convenient wrist and forearm rotational movements can be used to move the computer 300 about three orthogonal axes of rotation. Thus, a variety of position and gesture commands can be easily submitted to the wearable computer 300. A range of command input is available, through use of gesture commands, without recourse to buttons or other options that would require use of fingers.

The computer 300 can include a display screen 310 for display of data such as the GUI described above in Section 1 part c. Alternatively, the display screen 310 can display the image database described above in Section 1 Part c. Given the superior dorsal aspect location of the display screen 310, the display screen 310 is readily visible and conveniently located. The wearer can observe the display screen 310 with the wearer's hand held in a comfortable position and without interference from typical clothing. The fingers of the hand are free for other activities, such as holding a pen. Buttons 320 can be included in the computer 300 to provide alternative options for button entry of commands, e.g. on and off commands.

In one embodiment, as depicted in FIG. 7, the components of the wearable computer 300 are housed in an enclosure that possesses an approximately triangular shape with rounded vertices to conform to the superior dorsal aspect portion of the hand. The underside of the enclosure can further be shaped to conform to the surface of the superior dorsal aspect portion of the hand. Soft or flexible material can be employed in the enclosure to increase the comfort of the user. Further, the material can be textured or colored to disguise the presence of the computer 300 on the user's hand.

Alternative locations for the wearable computer can be envisioned. Placement on a foot would still permit movement about three axes as would placement on a head. Thus, an individual with diminished use of arms or arms and legs would have other options for interaction with a computing device through body movements. Placement at other locations on a hand would still permit movement about all three axes though without the convenience specific to the superior dorsal aspect location.

The mount that positions the wearable computer 300 at the superior dorsal aspect location can include various features, such as: straps; an adhesive; suction cups; a ring; a bracelet; or the computer 300 can be built into a glove.

Alternatively, components of the wearable computer 300 can be placed at different locations on or off of the body. For example, the motion sensor 330 can be mounted to the superior dorsal aspect of the hand while the display screen 310 is mounted elsewhere on the body or is placed off of the body.

Rather than a computer, the wearable device alternatively can be one of a variety of computing devices, e.g. a cellular phone, a pager, a two-way radio, or a multifunction wristwatch. If included, the display screen 300 can display data relevant to the particular computing device.

The above embodiments are merely illustrative. Those skilled in the art may make various modifications and changes that will embody the principles of the invention and fall within the scope of the invention.

I claim:

1. A method for processing an input command for a handheld computing device, comprising the steps of:

measuring movement of the entire handheld computing device over an interval of time with a motion sensor mounted to the device to generate a signal;

analyzing the signal measured over the interval of time to determine a series of position commands that correspond to a series of orientations of the device;

analyzing the signal measured over the interval of time to determine a gesture command that corresponds to the movement of the entire handheld computing device from a first orientation to a second orientation;

processing the gesture command to control the device as of said first orientation; and processing the series of position commands to control the device.

2. A method for processing an input command for a handheld computing device, comprising the steps of:

measuring movement of the device over an interval of time with a motion sensor mounted to the device to generate a signal;

analyzing the signal measured over the interval of time to determine a series of position commands that correspond to a series of orientations of the entire handheld computing device;

analyzing the signal measured over the interval of time to determine a gesture command that corresponds to the movement of the device from a first orientation to a second orientation;

processing the gesture command to control the device as of said first orientation;

processing a series of position commands to control the device; and ensuring a gesture command is not treated as a position command by returning the device to a state corresponding to said first orientation before proceeding to a state following the state corresponding to said second orientation, so as to avoid erroneous interpretation of any portion of the signal corresponding to a gesture command as a position command.

3. A method for processing an input command for a handheld computing device, comprising the steps of:

measuring movement of the entire handheld computing device over an interval of time with a motion sensor mounted to the device to generate a signal;

analyzing the signal measured over the interval of time to determine a series of position commands that correspond to a series of orientations of the device;

analyzing the signal measured over the interval of time to determine a gesture command that corresponds to the movement of the device from a first orientation to a second orientation; wherein the determined gesture command is one of a predefined set of gesture commands;

when the signal measured over the interval of time is determined not to be any of the predefined set of gesture commands, processing the series of position commands to control the device; and when the signal measured over the interval of time is determined to be one of the predefined set of gesture commands, preventing execution of the position commands and processing the gesture command to control the device as of said first orientation.

4. A handheld computing device, comprising:

an enclosure;

a motion sensor system, coupled with said enclosure, configured to detect the angular orientation of the entire handheld computing device; and a memory containing:
 a database of gesture commands;
 a procedure for analyzing the signal measured over the interval of time to determine a series of position commands that correspond to a series of orientations of the device;
 a procedure for analyzing the signal measured over the interval of time to determine a gesture command that corresponds to the movement of the entire handheld computing device from a first orientation to a second orientation; wherein the determined gesture command is one of a predefined set of gesture commands stored in the database of gesture commands;
 a procedure for processing the gesture command to control the device; and
 a procedure for processing the series of position commands to control the device.

5. A handheld computing device, comprising:

an enclosure;

a motion sensor system, coupled with said enclosure, configured to detect the angular orientation of the device; and a memory containing:
 a database of gesture commands;
 a procedure for analyzing the signal measured over the interval of time to determine a series of position commands that correspond to a series of orientations of the device;
 a procedure for analyzing the signal measured over the interval of time to determine a gesture command that corresponds to the movement of the device from a first orientation to a second orientation; wherein the determined gesture command is one of a predefined set of gesture commands stored in the database of gesture commands;
 a procedure for processing the gesture command to control the device; and
 a procedure for processing the series of position commands to control the device;

wherein configured to be mounted on a superior dorsal aspect of a hand to allow wrist and forearm rotational movement about three orthogonal axes.

6. The handheld computing device of claim 5, wherein the enclosure has an approximately triangular shape with rounded vertices to conform to the superior dorsal aspect of the hand.

7. The handheld computing device of claim 5, wherein the enclosure has an underside conforming to the surface of the superior dorsal aspect portion of the hand.

8. The handheld computing device of claim 4, wherein said set of gesture commands includes the gesture commands:

zoom in to observe a selected image in detail; and zoom out to observe a greater portion of a selected image.

9. The handheld computing device of claim 4, wherein said set of gesture commands includes a gesture command activated by rotational movement of the entire handheld computing device.

10. The handheld computing device of claim 4, wherein said set of gesture commands includes a gesture command activated by translational movement of the entire handheld computing device.

11. The memory of claim 5, further containing:

a procedure for storing a state value corresponding to each of the series of position commands; and a procedure for restoring the device to the state value corresponding to the last position command before the determined gesture command.

12. A handheld computing device, comprising:

an enclosure;

a motion sensor coupled with the enclosure to generate a signal after measuring movement of the entire handheld computing device over an interval of time;

a memory containing:
 a predefined set of gesture commands;
 a procedure for analyzing the signal measured over the interval of time to determine a series of position commands that correspond to a series of orientations of the device;
 a procedure for analyzing the signal measured over the interval of time to determine a gesture command that corresponds to the movement of the device from a first orientation to a second orientation; wherein the determined gesture command is one of the predefined set of gesture commands;
 a procedure for processing the series of position commands to control the device when the signal measured over the interval of time is determined not to be any of the predefined set of gesture commands; and
 a procedure for preventing execution of the position commands and processing the gesture command to control the device as of said first orientation when the signal measured over the interval of time is determined to be one of the predefined set of gesture commands.

13. A handheld computing device, comprising:

an enclosure;

a motion sensor coupled with the enclosure to generate a signal after measuring movement of the device over an interval of time;

a memory containing:
 a predefined set of gesture commands;
 a procedure for analyzing the signal measured over the interval of time to determine a series of position commands that correspond to a series of orientations of the device;
 a procedure for analyzing the signal measured over the interval of time to determine a gesture command that corresponds to the movement of the device from a first orientation to a second orientation; wherein the determined gesture command is one of the predefined set of gesture commands;
 a procedure for processing the series of position commands to control the device when the signal measured over the interval of time is determined not to be any of the predefined set of gesture commands; and a procedure for preventing execution of the position commands and processing the gesture command to control the device as of said first orientation when the signal measured over the interval of time is determined to be one of the predefined set of gesture commands; and a configuration that allows the handheld device to be mounted on a superior dorsal aspect of a hand to allow wrist and forearm rotational movement about three orthogonal axes.

14. The handheld computing device of claim 13, wherein the enclosure has an approximately triangular shape with rounded vertices to conform to the superior dorsal aspect of the hand.

15. The handheld computing device of claim 13, wherein the enclosure has an underside conforming to the surface of the superior dorsal aspect portion of the hand.

16. The handheld computing device of claim 12, wherein said set of gesture commands includes the gesture commands:

zoom in to observe a selected image in detail; and zoom out to observe a greater portion of a selected image.

17. The handheld computing device of claim 12, wherein said set of gesture commands includes a gesture command activated by rotational movement of the entire handheld computing device.

18. The handheld computing device of claim 12, wherein said set of gesture commands includes a gesture command activated by translational movement of the entire handheld computing device.

19. The memory of claim 13, further containing:

a procedure for storing a state value corresponding to each of the series of position commands; and a procedure for restoring the device to the state value corresponding to the last position command before the determined gesture command.

20. A computer program product for use in conjunction with a handheld computing device, the computing device including a motion sensor to generate a signal after measuring movement of the entire handheld computing device over an interval of time, the computer program product comprising a computer readable storage medium and a computer program mechanism embedded therein, the computer program mechanism comprising:

a first signal analyzing module for analyzing the signal measured over the interval of time to determine a series of position commands that correspond to a series of orientations of the device;

a second signal analyzing module for analyzing the signal measured over the interval of time to determine whether a portion of the signal that corresponds to the movement of the entire handheld computing device from a first orientation to a second orientation matches one of a predefined set of gesture command signal formats;

a position command processing module for processing the series of position commands to control the device when the signal measured over the interval of time is determined not to be any of the predefined set of gesture commands; and a state data recall procedure for preventing execution of the position commands and processing the gesture command to control the device as of said first orientation when the signal measured over the interval of time is determined to be one of the predefined set of gesture commands.

21. The computer program product of claim 20, wherein the second signal analyzing module is configured to determine whether a portion of the signal that corresponds to a pattern of movement of the entire handheld computing device from the first orientation to a second orientation matches one of a predefined set of gesture command signal formats.

22. The handheld computing device of claim 4, wherein the procedure for analyzing the signal measured over the interval of time to determine a gesture command is configured to determine a gesture command that corresponds to a pattern of movement of the device from the first orientation to the second orientation.

23. The handheld computing device of claim 12, wherein the procedure for analyzing the signal measured over the interval of time to determine a gesture command is configured to determine a gesture command that corresponds to a pattern of movement of the device from the first orientation to the second orientation.

* * * * *